United States Patent [19]
Ballard et al.

[11] Patent Number: 5,854,941
[45] Date of Patent: Dec. 29, 1998

[54] SYSTEM FOR ESTIMATING ACCESS TIME BY DERIVING FROM FIRST AND SECOND ROTATIONAL TIME FROM ROTATIONAL TIME TABLE BASED ON LOGICAL ADDRESS AND HEAD MOVEMENT TIME

[75] Inventors: Clinton L. Ballard, Suquamish; Timothy W. Smith, Seattle, both of Wash.

[73] Assignee: Acceleration Software International Corporation, Poulsbo, Wash.

[21] Appl. No.: 656,372

[22] Filed: May 31, 1996

[51] Int. Cl.⁶ ........................................................ G06F 3/00
[52] U.S. Cl. .................................................. 395/825; 711/4
[58] Field of Search ............................ 364/236.2; 360/48, 360/49, 77.08; 711/4; 395/825

[56] References Cited

U.S. PATENT DOCUMENTS

| | | | |
|---|---|---|---|
| 3,562,619 | 2/1971 | Hynes et al. ............................. | 318/603 |
| 3,564,513 | 2/1971 | Hibner ...................................... | 711/4 |
| 3,601,808 | 8/1971 | Vlack ........................................ | 711/4 |
| 4,145,745 | 3/1979 | De Bijl et al. ............................ | 711/4 |
| 4,805,090 | 2/1989 | Coogan .................................... | 395/894 |
| 5,018,095 | 5/1991 | Nissimov .................................. | 711/4 |
| 5,140,683 | 8/1992 | Gallo et al. .............................. | 711/117 |
| 5,179,684 | 1/1993 | Tohchi et al. ............................ | 711/111 |
| 5,220,653 | 6/1993 | Miro ......................................... | 395/677 |
| 5,245,594 | 9/1993 | Shimuzu ................................... | 369/62 |
| 5,247,498 | 9/1993 | Takekoshi et al. ...................... | 369/32 |
| 5,247,633 | 9/1993 | Nissomov et al. ....................... | 711/4 |
| 5,268,804 | 12/1993 | Wallis ...................................... | 360/78.04 |
| 5,327,549 | 7/1994 | Nissimov et al. ....................... | 395/652 |
| 5,367,652 | 11/1994 | Golden et al. ........................... | 711/4 |
| 5,430,855 | 7/1995 | Walsh et al. ............................. | 395/830 |
| 5,455,934 | 10/1995 | Holland et al. ......................... | 711/4 |
| 5,463,758 | 10/1995 | Ottesen .................................... | 711/114 |
| 5,548,795 | 8/1996 | Au ............................................ | 395/872 |
| 5,570,332 | 10/1996 | Heath et al. ............................. | 369/50 |
| 5,664,143 | 9/1997 | Olbrich .................................... | 711/112 |

OTHER PUBLICATIONS

Reducing Delay to Starting disk, IBM Technical Disclosure Bulletin, May 1993, pp. 463–464, May 1993.
L.E. Larson et al, Bidirectional minimum seek, IBM Technical Disclosure Bulletin, vol. 16, No. 4, pp. 1122–1126, Sep. 1973.
Enhanced Disk Task Sequencing, IBM Technical Disclosure Bulletin, bol. 29, No. 5, pp. 1946–1948, Oct. 1986.

*Primary Examiner*—Thomas C. Lee
*Assistant Examiner*—Anderson I. Chen
*Attorney, Agent, or Firm*—Steven P. Koda

[57] ABSTRACT

Disk I/O average access time is improved by estimating access time for pending I/O requests and selecting the request with the lowest estimated access time as the next request to be processed. To provide fast run-time estimation, disk characteristics are derived off-line and stored in files/tables for access during run-time estimation. A time (RT) to rotate the disk from a reference sector to each physical sector on the hard drive is derived and stored for each logical block address (LBA). A time (HT) for the heads to move an incremental number of cylinders also is derived. Access time of a destination LBA after completing access to a source LBA is estimated using estimated rotational times for the source and destination looked up in an RT table, and a head movement time estimate looked up in an HT table, based on a run-time calculated cylinder increment between the source and destination LBAs. Methods for developing rotational time estimates, head movement time estimates, disk zone characteristics, disk rotation time and other data are included.

14 Claims, 7 Drawing Sheets

SYSTEM FOR ESTIMATING ACCESS TIME BY DERIVING FROM FIRST AND SECOND ROTATIONAL TIME FROM ROTATIONAL TIME TABLE BASED ON LOGICAL ADDRESS AND HEAD MOVEMENT TIME

BACKGROUND OF THE INVENTION

This invention relates to hard disk drive I/O request scheduling and more particularly to a method and apparatus for estimating access time for pending hard drive I/O requests.

Computer systems include data storage devices, such as random access memory, hard disk drives, floppy disk drives and CD-ROM drives. Data is input from such devices for processing, display or other purposes. Data is output to such devices for storage and later retrieval. In a general purpose microcomputer (e.g., personal computer, UNIX workstation, Macintosh computer) an operating system includes device drivers called indirectly by user application programs. The device driver is a computer program for supporting access to a given peripheral device. With regard to a hard disk drive, a device driver serves as a communication control program between an application/operating system and a hard disk drive controller. The disk drive controller directs and controls reading from and writing to a hard disk. The controller handles such tasks as positioning read/write heads, mediating between disk drive operations and processing unit needs, and controlling the transfer of data to and from hard disks.

Figure 1:
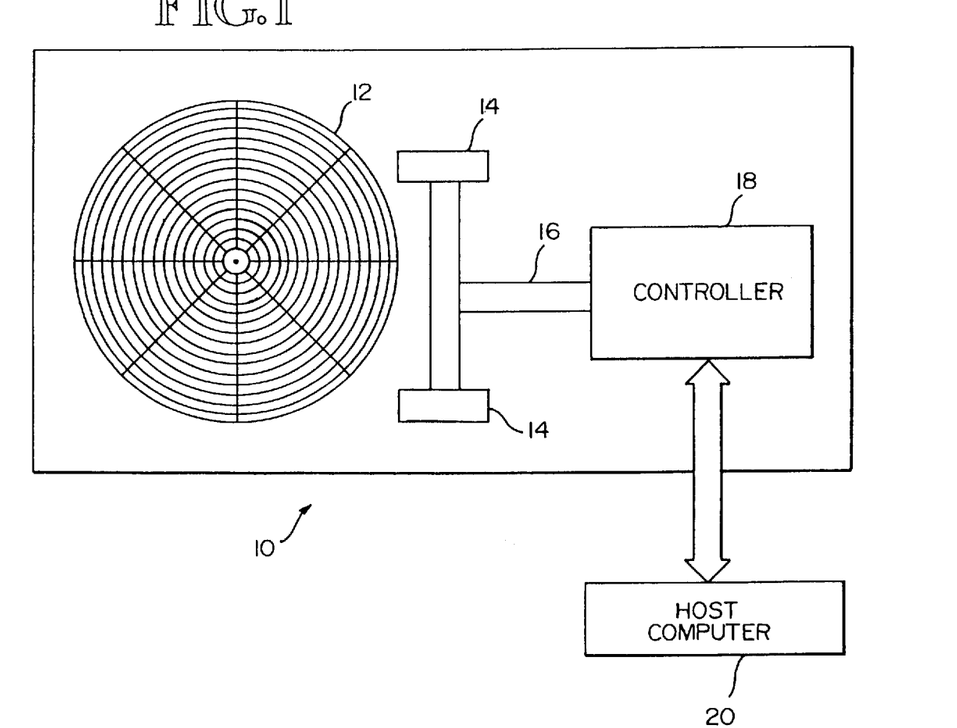
FIG. 1 is a diagram of a hard disk drive coupled to a host compute.

A hard disk drive is an electromechanical device that reads from and writes to one or more hard disks. FIG. 1 shows a block diagram of a hard disk drive 10 including a hard disk 12. The hard disk 12 includes one or more disk platens 12' (e.g., 2 to 8; see FIG. 2). The main components of the drive are a spindle 13 on which the platens 12 are mounted, a drive motor for spinning the platens, one or more read/write heads 14, a seek mechanism 16 for positioning the heads 14 over the platens 12', and a controller 18 which synchronizes read/write activities and transfers information to and from other component of a host computer system 20.

A hard disk platen 12' is an inflexible platter coated with a material for allowing data to be recorded magnetically. A typical hard disk rotates at a constant velocity of approximately 3600 revolutions per minute. The read/write heads ride over the surface of the disk platens on a cushion of air 10 to 25 millionths of an inch deep. The hard disk platens are sealed within the disk drive preventing contaminants from interfering with close head to disk tolerance.

In operation a host computer provides logical instructions to the disk drive 10 to read or write data into memory locations on the disk 12. Although the instructions typically include a logical address for the data, the data is not stored in logical format. The data is stored in a physical address location. The controller 18 typically translates the logical address into a physical address. Once the translation occurs the controller directs the heads 14 to the physical address location at which the desired data is stored or read. The time required to move a disk drive's read/write head 14 to a specific cylinder on a disk is referred to as the "seek time". The time required move the head and complete an I/O request for a data read/write operation is referred to as the "access time".

Figure 2:
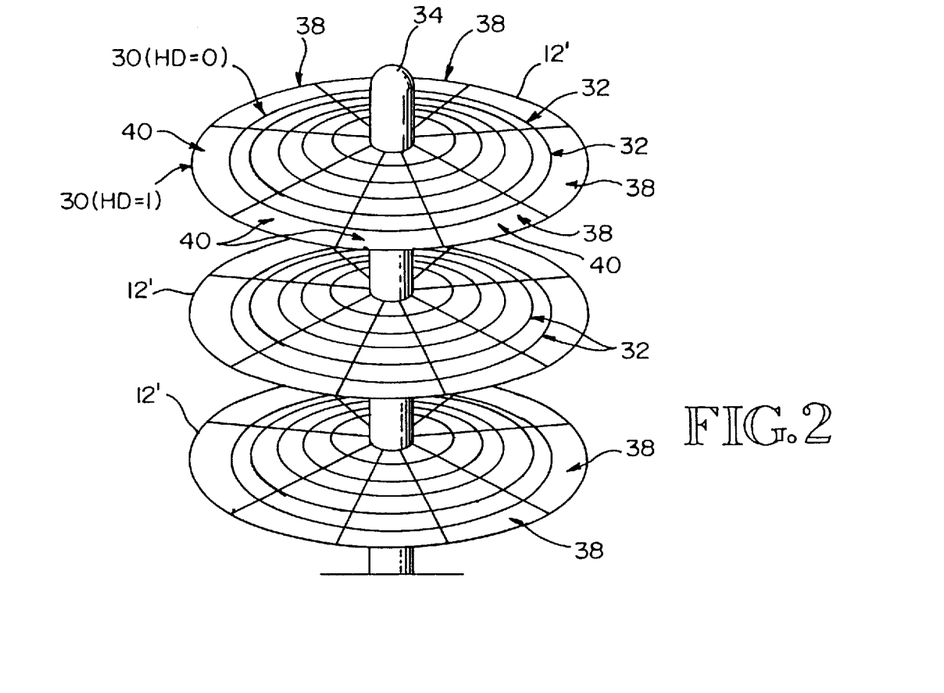
FIG. 2 is a diagram of a hard disk and spindle.

FIG. 2 shows an isolated perspective view of a several hard disk platens 12'. The figure illustrates how data is physically organized and stored. Each side of a given platen 12' has a data storage surface 30. There are two data storage surfaces 30 (e.g., head 0 and head 1) per platen 12'. Each surface 30 includes a plurality of concentric circles called "tracks" 32. The outermost track generally is designated as a first logical track (e.g., track 0). The innermost track is generally designated as the last track (e.g., track 999 on a 1000 track disk). The individual disks 32 are journalled about a single spindle 14 and physically stacked one above the other. The combination of like track numbers on each surface of each disk define a "cylinder."

Each storage surface 30 also is divided into a number of pie-shaped "sectors" 38. A plurality of areas created by a number of sectors 38 and tracks 32 is called a "segment." Each segment 40 is capable of storing 512 bytes of data and is accessed by a three coordinate physical address corresponding to the cylinder number, head number and sector number. Early disk drive systems included 17–44 sectors per track. Such number has increased to 100 sectors per track and higher using special data access techniques. In addition, modem disk drives take advantage of the greater circumferential length of outer tracks by including more sectors along outer tracks than along inner tracks. Such drives implement zone bit recording to store more sectors on tracks further away from a hard disk's center. Groups of adjacent cylinders form a zone. A given zone has the same number of tracks per cylinder and the same number of sectors per track. A different zone has a common number of sectors per track which is different than the number of sectors per track in other zones.

During operation the controller 18 receives a logical address and translates the address into physical cylinder, physical head and physical sector components of a physical address. The controller then sends signals to move the heads 16 to the physical address. When processing a series of data access requests (e.g., reads or writes), the conventional controller performs the translation and accesses on a first come first serve basis without changing the order of the requests.

Scheduling has been performed at the operating system level to arrange the requests in an order that may reduce the time to process the requests. Previously the operating system did the logical to physical address translation and thus could improve access time by arranging the order of access requests. During the 1960's and 1970's the operating system had intimate knowledge of the hard disk geometry. Hard disks had a relatively simple geometry with fixed cylinder, head and sector mapping. As the personal computer evolved the geometry of hard disks diversified. As a result, conventional operating systems communicate with the hard drive using logical block addresses. The logical block address is a number starting at 0 and increasing up to N-1, where N is the number of addressable sectors of a disk. Scheduling I/O requests is still performed by some operating systems by sorting the logical block addresses (LBAs) in numerical order using an elevator algorithm. An elevator algorithm schedules the next I/O request with the next LBA number in a fixed direction. When a highest LBA number in the queue is processed, for example, the direction changes. The LBA with the next lowest LBA number is processed. The elevator algorithm assures that all pending LBA I/O requests are processed. Conventional non-multitasking operating systems such as MS-DOS and the MAC-OS do not order the I/O requests to optimize I/O scheduling. Conventional multi-tasking operating systems such as Novell's Netware and various versions of the UNIX operating systems have performed scheduling optimization based on an elevator algorithm. Because there is not a reliable correspondence between LBA number order and physical sector address order, using LBA numbers to optimize scheduling is of limited value, especially for modern drives with differing geometries. Thus, there is a need for a more versatile and effective method of scheduling I/O requests processed by a disk drive.

SUMMARY OF THE INVENTION

According to the invention, hard disk I/O average access time is improved by estimating access time for pending I/O requests and selecting the request with the lowest access time as the next request to be processed. Such improvement occurs when there is a current I/O request being processed and pending requests to be processed.

While the current request is being retrieved, the access time for the hard drive to move from the physical address location of the current I/O request to the respective physical addresses for each pending request is estimated. The pending request with the lowest access time is returned as the next I/O request to be processed.

According to one aspect of the invention, an estimated time to rotate the hard disk from a reference sector (e.g., physical sector 0) to each physical sector on the hard drive is derived during installation. A file is created indexed by logical block address (LBA) number storing such disk rotation time (RT). The data structure is analogous to a clock face in which time 0 corresponds to sector 0 and each physical sector/LBA number corresponds to a position on the clock. The disk rotation time stored for each LBA number is between 0 and the time for just under 1 revolution of the hard disk. The file is referred to herein as the RT file.

According to another aspect of the invention, in an alternative embodiment the estimated time to rotate the hard disk from a current source sector to a destination sector is calculated during run-time. For a known hard disk geometry the first sector in each track is positioned at a known rotation time (e.g., offset=2 ms) away from the last sector of the prior track. The rotational time estimate between source and destination is determined by calculating the a first time component which is the disk rotation time to the destination LBA relative to the first sector in the destination's track. A second time component is the disk rotation time to the source LBA relative to the first sector in the source's track. A third time component is the offset constant times the track differential between source and destination. The track differential is estimated as the integer portion of the destination LBA minus source LBA divided by the average number of sectors per track. The calculated rotational time estimate is the first component plus the third component minus the second component.

According to another aspect of the invention, in another embodiment a rotational time estimate table RT' is generated. The RT' table includes a rotational time estimate for the first sector of each track. Relative rotational time of the source is calculated by adding the product of sector offset of the source within the track and the average time for the disk to rotate one sector, to the value in the RT' table for the source's track. Relative rotational time of the destination similarly is similarly calculated. The difference in relative rotational time estimates for source and destination then is adjusted based on the incremental number of tracks between the source and destination. the adjusted value is the rotational time estimate.

According to another aspect of the invention, an estimated time for the heads to move an incremental number of cylinders is derived during installation for every possible increment. A file is created indexed by physical cylinder increment ($\Delta cyl$) storing the head movement times (HT). There is a head movement time stored for $\Delta cyl=1$, another for $\Delta cyl=2$, and so on. The file is referred to herein as the HT file.

According to another aspect of the invention, the specific geometry of a given hard drive is determined at installation. In particular, a file of zone characteristics is generated. For each zone, the LBA number of the first sector in the zone (ZONE_START_SECTOR) is determined and stored, the number of tracks (NUM_TRACKS) in the zone is determined and stored, the number of sectors per track (ZONE_SIZE) is determined and stored, and the track number for the first LBA in the zone (ZONE_START_TRACK) is determined and stored. The file is referred to herein as the ZONES file.

During run-time while a current I/O request is being processed, an access time estimate to move from the current I/O request physical position to a pending I/O request physical position is estimated for each pending I/O request. In deriving the estimated time (ESTIMATE) for a given pending I/O request, the pending I/O request is referred to as a destination and the current I/O request as a source. The LBA number for the source and destination are received with the I/O request. To derive the estimated time, at one step the disk rotation times (RT) for the source and the destination each are retrieved from the RT file using source and destination LBA numbers as respective indices into the file.

At another step the physical track number for the source and the destination is obtained by examining the ZONES file. The known LBA number is used to determine what zone the LBA is in. Because sector numbers are consecutive within a given zone, the starting LBA in the zone (ZONE_START_SECTOR), the known LBA number, and the number of sectors per track (ZONE_SIZE) enable calculation of a track offset within the zone for the track which includes the LBA. The track offset is added to the starting track number in the zone (ZONE_START_TRACK) to get the physical track number.

At another step the difference in physical cylinder numbers between the source and destination is determined. Such difference is a physical cylinder increment ($\Delta cyl$) that the head will move in seeking the destination. Because a given hard disk has a constant number of tracks per cylinder (which is determined at installation time), the physical cylinder increment is derived by dividing the difference in physical track numbers by the number of tracks per cylinder. The result is $\Delta cyl$.

At another step, the head movement time (HT) to move the head from the source to the destination is obtained by indexing in the HT file using the calculated $\Delta cyl$.

At another step the disk rotation time (RT) and head movement time (HT) are used to obtain the estimated access time to move from source to destination. The estimated disk rotation times for the source and destination determine a first estimate of the time for the disk to rotate from the source to the destination. When the head movement time (HT) is less than the first estimate, the estimated access time ESTIMATE is the first estimate. When the head movement time (HT) is greater than the first estimate, the estimated access time ESTIMATE is the first estimate plus the time for one full revolution of the hard disk.

The disk rotation time to move from the source to the destination (the first estimate) is RT(destination) minus RT(source) when RT(destination) is less than RT(source), and is RT(destination) plus one revolution time of the hard disk, minus RT(source) when RT(destination) is greater than RT(source).

An estimated access time is determined for each pending I/O request relative to the current I/O request. The pending I/O request with the shortest estimated access time is scheduled as the next I/O request to be processed.

According to various embodiments of the invention, a computer program executed for carrying out the inventive aspects is embedded into the hard disk controller or other integrated circuit device or is loaded onto a host computer system. The computer program is an operating system utility/extension or peripheral device microcode. The computer program is packaged in a CD-ROM, floppy disk, or other merchandisable media for mass distribution, is downloaded from a first computer system to another computer system for electronic distribution, or is embedded into memory for a processor, controller or other peripheral or host device.

According to one advantage of the invention hard disk drive access time is reduced for a queue of I/O requests. These and other aspects and advantages of the invention will be better understood by reference to the following detailed description taken in conjunction with the accompanying drawings.

DESCRIPTION OF SPECIFIC EMBODIMENTS

Overview

To optimize I/O request scheduling a computer program embodying inventive aspects of this invention is executed by a processor in a host computer system 20 including a hard drive 10, or is executed by a disk drive controller 18 of the hard drive 10. The computer program includes a run-time process and one or more data gathering installation or off-line processes. The run-time process includes a basic scheduler which interfaces to an operating system device driver, and an access time estimation module. The estimation module determines an estimated access time for a given disk drive to complete an I/O request of a destination physical sector on the drive's hard disk 12 relative to a completion time for a current I/O request of a source physical sector location. The data gathering processes derive data characterizing the hard drive 10 which is used by the run-time process to rapidly estimate access time. The data gathering processes are performed once for a given drive 10, either at the factory, at installation or thereafter. Because the data gathering processes take many hours to complete execution on, for example, a 120 MHz PENTIUM™ personal computer running WINDOWS 95™, a best mode embodiment allows the data gathering processes to be performed at installation, incrementally over time, and/or in the background while a user performs other computing tasks.

As one run-time scenario, a user interacting with a host computer 20 instigates some function requesting data that is stored on a hard disk 12. The application program executing the function requests the data. System software interfaces to the application program to enable retrieval of the data. An operating system, utility programs and device drivers typically are involved in the process. For some requests the data is present in a system cache (e.g., RAM). For other requests the data has to be read from or written to the hard drive 10. For requests requiring data to be read from or written to the hard drive 10, a hard drive device driver issues an I/O request to the hard drive controller 18. Such request is processed by the run-time scheduler. In one embodiment, the scheduler is a utility program executed by the host processor which intercepts the I/O request and issues its own requests based upon its own scheduling order. In another embodiment the scheduler is embedded into the hard disk microcontroller 18 and receives the request from the device driver. For each embodiment, the hard drive characteristics used by the estimation module are pre-calculated. The data gathering processes are executed by the host processor or are performed by another processor not part of the host system (e.g., at the factory).

Disk Drive I/O Request Scheduling

Figure 3:
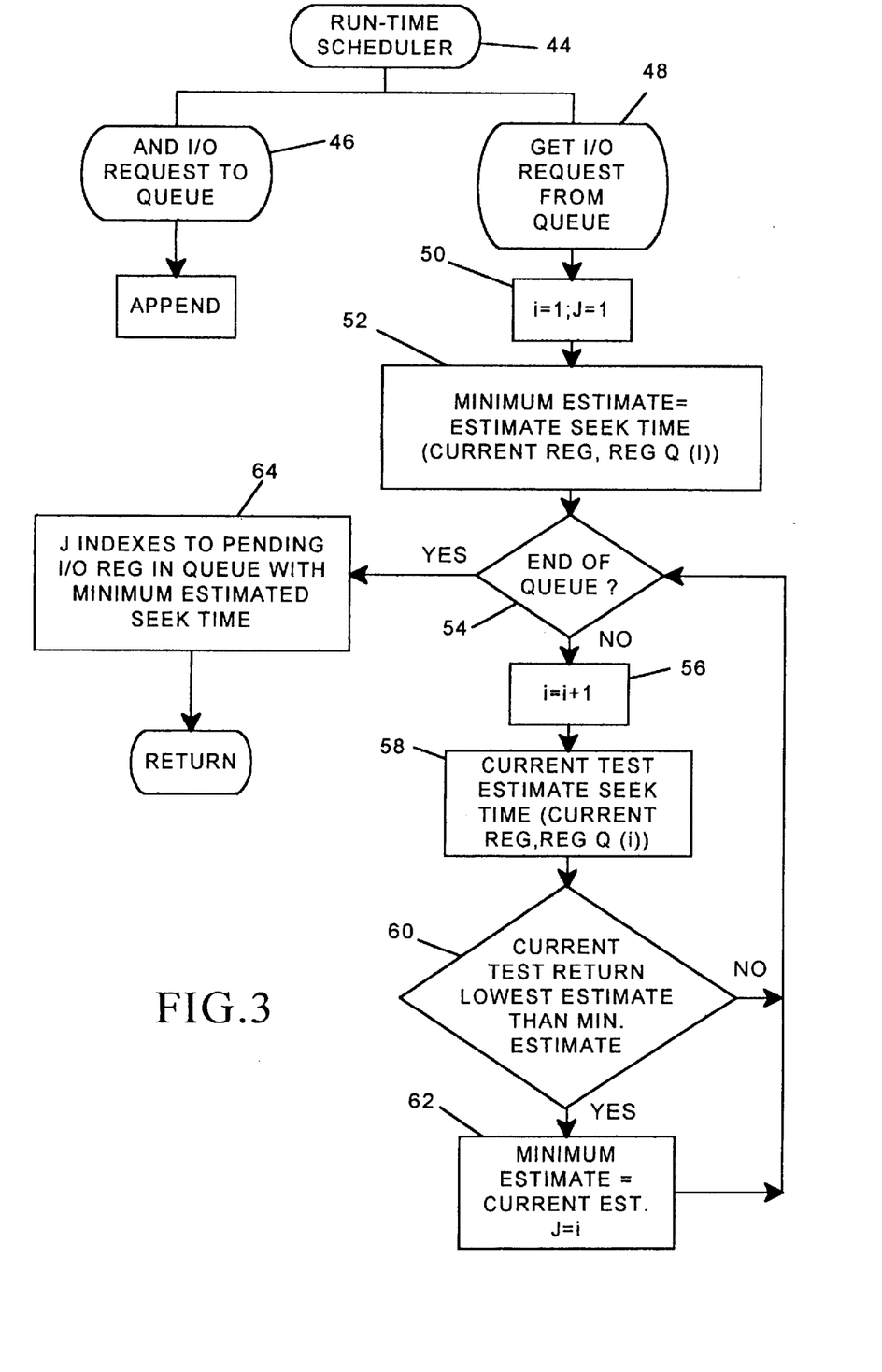
FIG. 3 is a flow chart of a run-time scheduler process according to one embodiment of this invention.

FIG. 3 is a flow chart of one embodiment of the run-time scheduler process 44. The scheduler performs two basic functions. One function 46 is to add an I/O request to a queue of pending I/O requests. The other function 48 is to get the next of the pending I/O requests to be processed. Each I/O request specifies a logical block address (LBA) of data to be retrieved from the hard disk 12. Processing an I/O request includes retrieving the requested data from the hard disk 12.

Any of many conventional methods are used to add the I/O request to the queue of pending requests. At step 50, the I/O request simply is appended to the queue. An insertion sort is performed under alternative embodiments, wherein the pending I/O requests are arranged in numerical LBA order. An elevator algorithm is performed in other embodiments. Because the get next I/O request function 48 determines the next pending request to be processed, the order achieved at function 46 is not significant and may be arbitrary.

The function 48 "get I/O request from queue" includes multiple steps. The access times from the current sector location of the current I/O request to the sector location of each pending I/O request in the queue are estimated. The pending I/O request with the minimum estimated access time is selected as the next I/O request to be processed. In one embodiment at step 50 indexes 'i' and 'J' into the pending I/O request queue are initialized. At step 52 the access time for the pending I/O request at such initial index 'i' is estimated and set as the minimum estimated access time. At step 54 the index 'i' then is tested to determine if the end of the queue has been reached. If the end is not reached, then the index 'i' is incremented at step 56. At step 58 the access time is estimated to move the heads from the sector location current I/O request (Current Req) to the sector location for the next pending I/O request (Req Q(i)). At step 60 such estimated access time is compared to the minimum estimated access time previously derived. If less such estimated access time becomes the minimum estimated access time at step 62 and index 'J' is set to index 'i'. If greater, or after the minimum access time is redefined, the process loops back to test the index at step 54 to determine if the end of the queue has been reached. Eventually the end of the queue is reached. At step 64 the pending I/O request having the minimum estimated access time is identified by the current value for index 'J'. Such request is scheduled as the next I/O request to be processed after the current I/O request finishes.

Estimating Access Time

Figure 4:
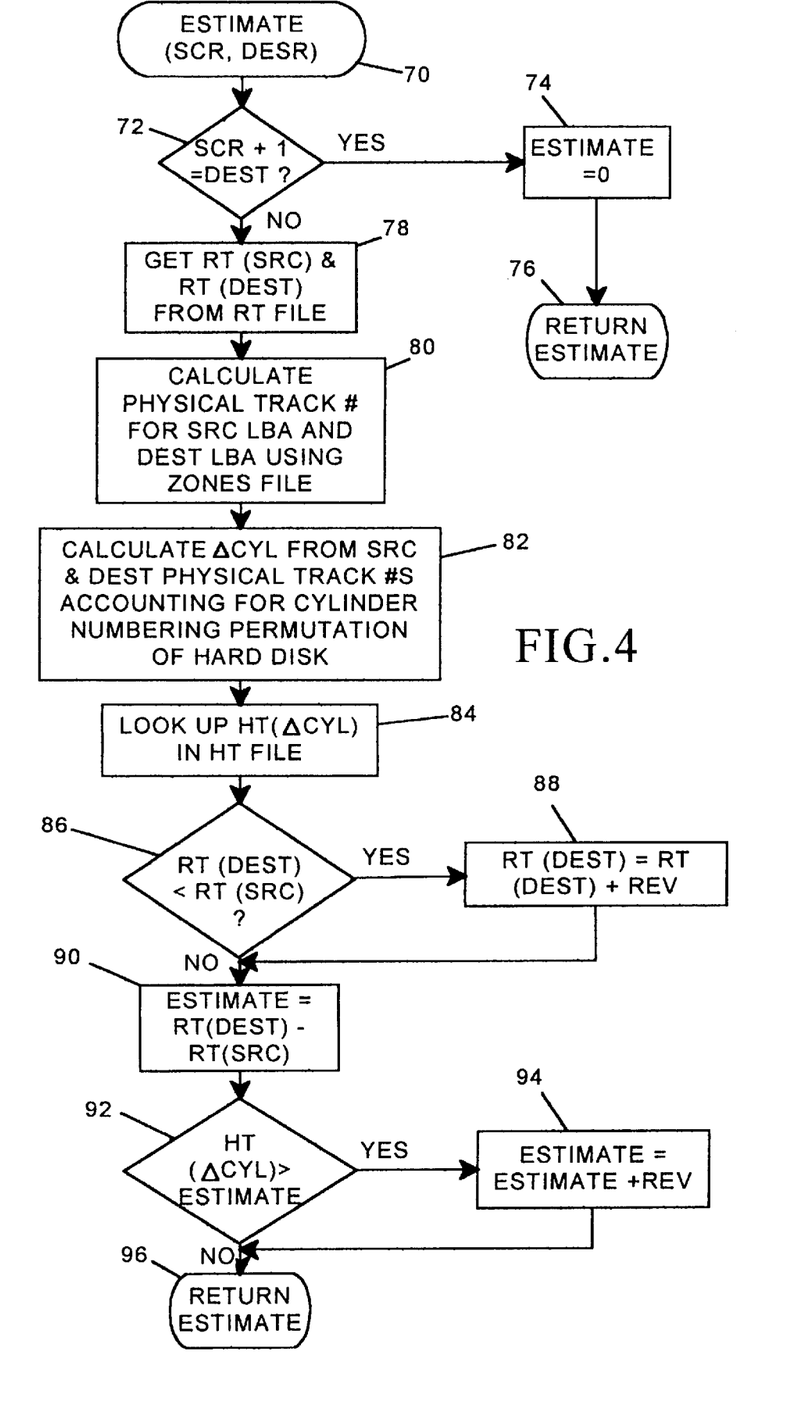
FIG. 4 is a flow chart of a run-time access time estimating function according to one embodiment of this invention.

In executing the get I/O request function 48, estimated access time is calculated several times. FIG. 4 is a flow chart of the method for estimating access time between a source and a destination. The function ESTIMATE 70 receives a source LBA number SRC and a destination LBA number DEST and returns a value ESTIMATE='estimated access time' to go from LBA number SRC to LBA number DEST. At a first step 72 the source SRC and destination DEST are tested to determine if the destination is the next LBA number after SRC. It is a common occurrence for such case to occur (e.g., when the application performs a large read or write which is broken up into multiple I/O requests to adjacent LBA numbers). Because in most cases, the physical sector numbers corresponding to SRC and DEST also will be adjacent an estimate access time ESTIMATE of zero is returned (see steps 74, 76). In effect, this forces the minimum estimate determined during function 48 to be the pending I/O request having a sector address adjacent to the current I/O request sector address. In one embodiment such case occurs often enough to warrant a short cut through function 70.

To derive the estimated access time from the source SRC to the destination DEST, data values are read from various files. Such files are referred to as the rotational time 'RT' file, head movement time 'HT' file, and the ZONES file. Each file includes data characterizing the hard drive. By predetermining such characteristics and storing the resulting data, the run-time estimation function 70 is performed with a minimal number of processor instructions. These files are generated by the data gathering processes described below in a separate section.

Figure 5:
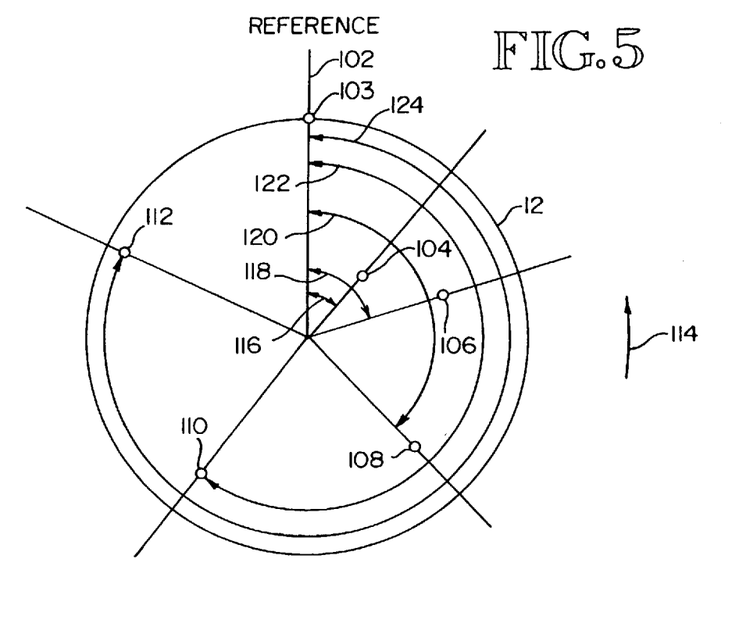
FIG. 5 is a diagram of a hard disk showing rotational distances for various sectors relative to a reference location.

Referring again to FIG. 4, at step 78 an estimate RT(SRC) of the time to rotate the hard disk 12 from a reference location to the source is looked up in the RT file using SRC as an index. In addition an estimate RT(DEST) of the time to rotate the hard disk from a reference location to the destination is looked up in the RT file using DEST as an index. Such times are disk rotation estimates, not access time estimates. An access time estimate differs by also accounting for radial motion of the heads. The rotational time estimate only relates to angular rotation of the hard disk. FIG. 5 is a diagram of a hard disk illustrating the rotational time concept. Rotational time is the time it takes for the hard disk 12 to rotate from a reference position 102 (e.g., sector 0, LBA 0 at part number 103) to a given destination sector. Exemplary destination sectors are indicated by part numbers 104, 106, 108, 110, 112. The hard disk rotates in a counter-clockwise direction 114. With regard to destination sector 104, the time for the disk to rotate through the angle 116 is stored as RT(sector 104). With regard to destination sector 106, the time for the disk to rotate through the angle 118 is stored as RT(sector 106). With regard to destination sector 108, the time for the disk to rotate through the angle 120 is stored as RT(sector 108). With regard to destination sector 110, the time for the disk to rotate through the angle 122 is stored as RT(sector 110). With regard to destination sector 112, the time for the disk to rotate through the angle 124 is stored as RT(sector 112). The rotational times are stored in the RT file using the corresponding LBA number as an index as shown in Table A below:

TABLE A

| RT File | |
|---|---|
| LBA No. | RT (LBA No.) |
| 0 | RT (0) |
| 1 | RT (1) |
| . | . |
| . | . |
| . | . |
| n-1 | RT (n-1) |

At step 80 the physical track number for each of the source and the destination are derived using the information in the ZONES file. The ZONES file includes the following data for each zone:

starting track number in the zone (ZONE_START_TRACK)

starting LBA in the zone (ZONE_START_SECTOR)

number of sectors per track (ZONE_TRACK_SIZE)

number of tracks in the zone (NUM_TRACKS)

Sector numbers are consecutive within a given zone. By comparing the source LBA number SRC to the starting sector number in each zone, the zone including the source is located. The track offset within the zone for SRC then is calculated as the integer portion of (SRC minus ZONE_START_SECTOR) divided by ZONE_TRACK_SIZE. The physical track number for the source is ZONE_TRACK_START plus the source's track offset. Similarly, the zone including the destination is located. The track offset within the zone for DEST is calculated as the integer portion of (DEST minus ZONE_START_SECTOR) divided by ZONE_TRACK_SIZE. The physical track number for the destination is ZONE_TRACK_START plus the destination's track offset. The source and destination may be in different zones, in which case the zone information differs for calculating the source track number and destination track number.

At step 82, the difference in physical cylinder numbers between the source and destination is determined. Such difference is a physical cylinder increment ($\Delta$cyl) that the head will move from the source in seeking the destination. Because a given hard disk has a constant number of tracks per cylinder, the physical cylinder increment is derived by dividing the difference in source and destination physical track numbers by the number of tracks per cylinder. The integer portion or the integer portion plus one is $\Delta$cyl. The appropriate value is selected depending on where the track is within a given cylinder. If there are 5 tracks per cylinder and source track s at the 5th, then a track difference of 6 corresponds to $\Delta$cyl=2 (e.g., integer portion of 6/5 plus one). If the source were any of the 1–4th tracks in the cylinder, then $\Delta$cyl=1 (e.g., integer portion of 6/5). The track offset within a cylinder is determined by the track offset within a zone. It is assumed that the first track in a zone is on the same platen 12', and thus at the same track offset value within a cylinder. The track offset within the cylinder is estimated to be the remainder portion of (track number—ZONE_START_TRACK)/ number of tracks per cylinder.

In another embodiment an average number of sectors per track is known or determined at installation. The difference between destination LBA and source LBA is divided by the average number of sectors per track to determine a track increment. As the sector numbers within a cylinder typically are numbered consecutively the track increment is divided by the number of cylinders per track to obtain the estimated cylinder increment ($\Delta$cyl).

At step 84, an estimate of the time, HT($\Delta$cyl), to move the head from the source to the destination is obtained by indexing in the HT file using the calculated $\Delta$cyl.

With all the pertinent data readily accessible from the files, access time is soon calculated. At step 86, the estimated rotational movement time RT(DEST) is compared to estimated rotational movement time RT(SRC) to determine whether RT(DEST) is less than RT(SRC). If less, then RT(DEST) is normalized by adding the time for one revolution of the hard disk to RT(DEST) at step 88. At step 90, a first estimate then is set as RT(DEST) minus RT(SRC). This is an estimate of the time it takes the hard disk to rotate from the source physical sector to the destination physical sector. At step 92, the head movement time HT($\Delta$cyl) is compared to the first estimate. If the head movement time HT($\Delta$cyl) is greater than the first estimate, then by the time the head moves from the source track to the destination track the hard disk will already have rotated past the destination sector address. Thus for the case where HT($\Delta$cyl) is greater than the first estimate, at step 94 a final estimate is obtained by adding the time for one revolution REV of the hard disk to the first estimate. For the case where HT($\Delta$cyl) is not greater than the first estimate, the first estimate is the final estimate. The final estimate ESTIMATE is returned as the estimated access time to go from source to destination at step 96.

Figure 6:
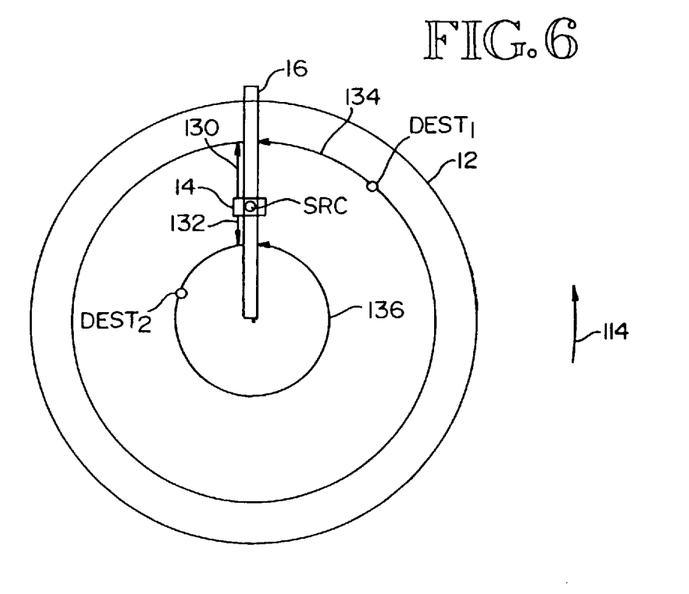
FIG. 6 is a diagram of a hard disk, drive head and seek mechanism showing radial and rotational distances covered in moving from a source sector to destination sectors.

FIG. 6 is a diagram of a hard disk 12 showing the access mechanism 16 for moving the heads 14 radially among cylinders. The hard disk 12 rotates in a counter-clockwise direction 114. Shown are the locations of a source LBA SRC, a first destination LBA DEST$_1$, and a second destination LBA DEST$_2$. The distance 130 is a cylinder increment between the cylinder including the source and the cylinder including the first destination. The distance 132 is a cylinder increment between the cylinder including the source and the cylinder including the second destination. The angle of rotation 134 corresponds to a time for the disk 12 to rotate to move the first destination under the access mechanism 16. The angle of rotation 136 corresponds to a time for the disk 12 to rotate to move the second destination under the access mechanism 16. Note that if the rotational time corresponding to angle 134 is less than the time for the head to move the radial increment 130, then by the time the head 14 moves to the cylinder including the first destination the disk has rotated past the destination sector and the estimated access would encompass the additional time for the disk to rotate around again to bring the first destination sector under the head 14. In such case the estimated access time is the time to move across angle 134 plus one revolution time (REV).

Miscellaneous data also determined during the data gathering processes and used by the estimate function 70 include the time for one revolution of the hard disk.

Data Gathering Processes

The data gathering processes are executed to obtain data concerning the zones and operating speeds of the hard drive under operating conditions. In one embodiment the following data is gathered and stored for use during run-time estimations: (i) disk rotation time; (ii) table indexed by LBA number of the disk rotation time to rotate from a reference position to sector on disk; (iii) zone table of zone size and zone starting information; and (iv) head movement time to move incremental number of cylinders.

Among the challenges of gathering accurate data is to avoid the caching schemes which would give false indications of disk rotation time and head movement times and corrupt the data characterizing the hard drive. System caches are avoided by turning them off. In some embodiments caches included on the hard disk drive can not be turned off by a utility program executed by the host processor. To work around such caches the cache is flushed between calls to the same location, or the same address is not called until sufficient calls have been made to fill the cache and overwrite the data for the last time such address was called. To avoid cache look-ahead, the hard disk sectors are accessed in reverse order during the data gathering processes.

Figure 7:
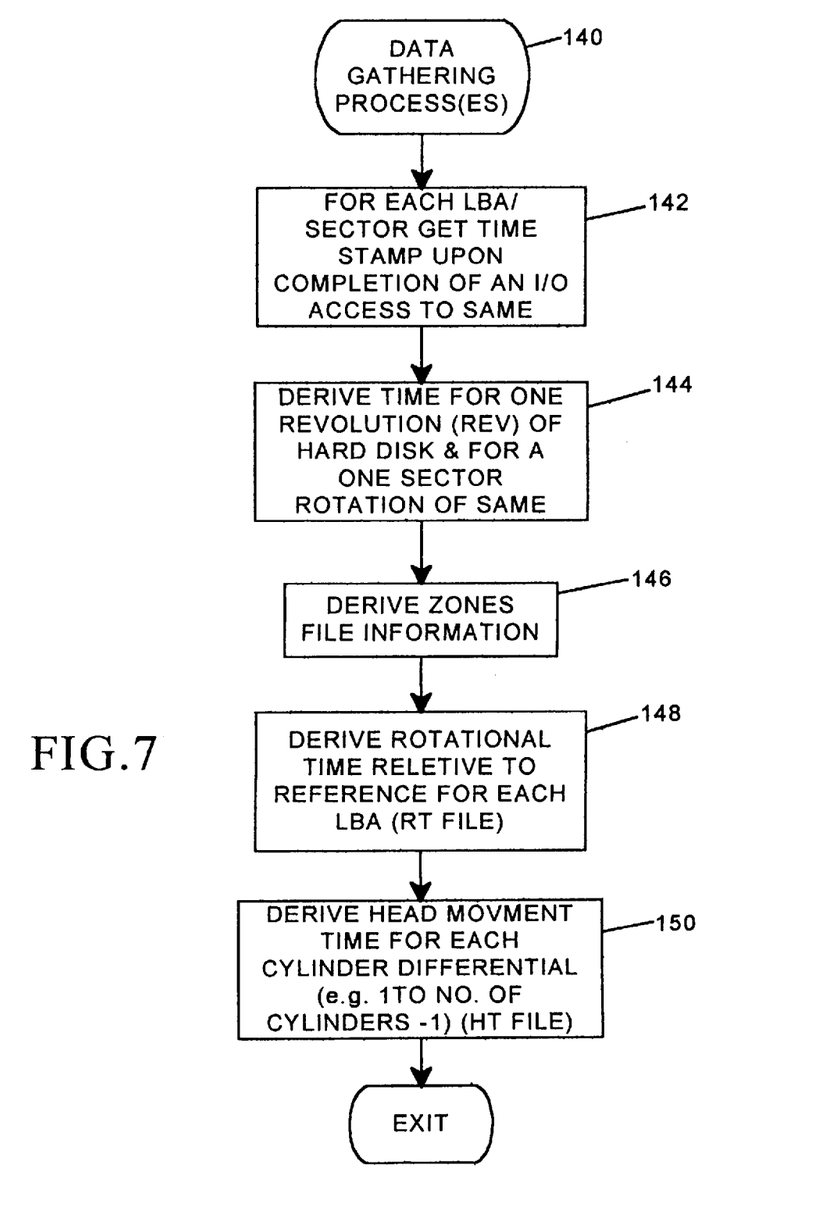
FIG. 7 is a flow chart of off-line data gathering processes according to an embodiment of this invention.

TIME_STAMPs:

FIG. 7 shows a flow chart for the data gathering process (es) 140. At step 142 a time stamp is obtained for each LBA number/sector. At step 144 the time REV for the hard disk to make one revolution and the time for the hard disk to rotate one sector is estimated. At step 146 the zone information for the ZONES file is determined. At step 148 the disk rotational time for the hard disk to rotate from a reference position to each LBA is determined. At step 150 the head movement time for the heads to move each possible increment of cylinders is estimated. In one embodiment each step 142–150 is performed in a common process. In another embodiment different ones or more of the steps 142–150 are performed in separate processes. In yet another embodiment, the steps 142–150 are performed for less than the entire hard disk at a time.

Following are detailed descriptions of procedures for performing each of steps 142–150. With regard to step 142, a reference position on the hard disk is selected. In one embodiment the reference position corresponds to a prescribed LBA number (e.g., LBA number 0). An I/O request is performed for each LBA on the hard disk. A time stamp is obtained at the completion of each request. In one embodiment, a host processor 32-bit counter is used to generate the time stamp. Overflow of the counter is tracked to enable one continuous range of time stamps. In such embodiment rotational time estimate (see step 148) is a simple calculation of LBA access time minus reference sector access time.

Alternative methods for generating time stamps include getting a time stamp for a reference sector then for a given LBA, then repeating the two steps for each LBA. The repeated access to the reference sector, however, is time consuming and if cache is present introduces a task of avoiding retrieving the data from cache on subsequent iterations. In a preferred embodiment, a time stamp for the reference sector is obtained every X number of LBAs, where X is sufficiently high to assure that the data for the reference sector is not in cache. Thus, the reference sector is accessed from the hard disk, not the disk cache.

At the completion of the I/O request to the reference sector the time stamp is read. Next an I/O request is performed for a k-th LBA. At the completion a time stamp is read. Next an I/O request is performed for a k-1th LBA. At the completion a time stamp is read. The process repeats for X (e.g., X=1000) times. Thus, time stamps are generated for LBAs k through k-999. Thereafter, a time stamp is obtained once again for the reference sector followed by time stamps for another 1000 LBAs. In one embodiment the process repeats until time stamps are obtained for all LBAs, there being a different reference sector time stamp for every X LBAs.

Figure 8:
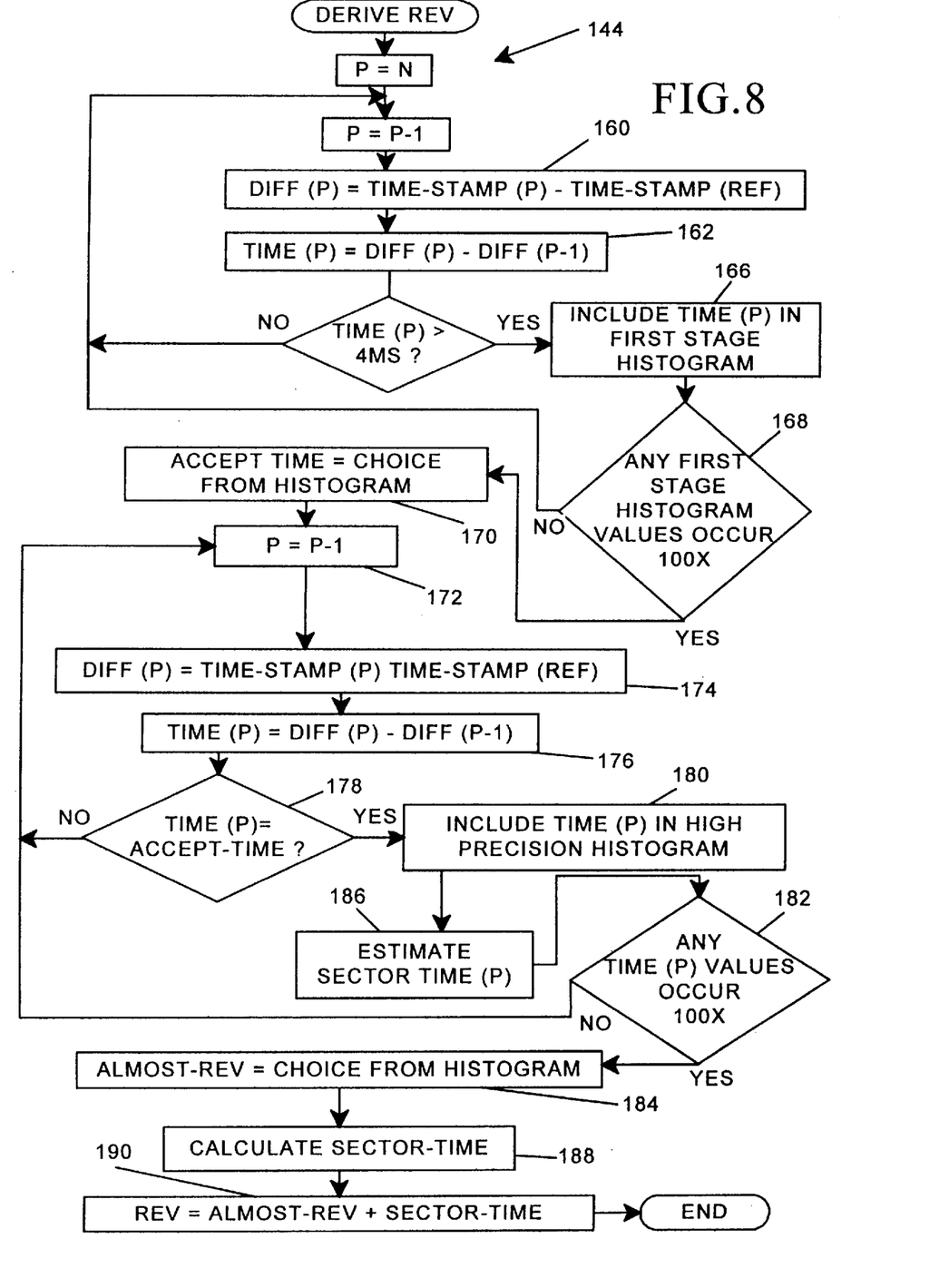
FIG. 8 is a flow chart for deriving estimated disk revolution time.

REV and SECTOR_TIME:

FIG. 8 shows a flow chart of a method for deriving the time 'REV' for one revolution of the hard disk. In deriving REV the time stamp data from step 142 (FIG. 7) is used. In an iterative manner the time stamp for an LBA has subtracted from it the reference sector time stamp gathered for such LBA to generate a time difference DIFF(LBA=p) (see step 160). The DIFF for the prior iteration LBA LAST_DIFF(LBA=p-1) is subtracted from the DIFF for the current iteration LBA at step 162. Most of the time such LBAs are adjacent to each other on a given track. Thus, it is expected that the time difference (TIME) between DIFF and LAST_DIFF corresponds to one revolution time less the time to move one sector. A threshold value (e.g., 4 ms, 8 ms or another threshold less than an expected revolution time and greater than an expected time to move the head one track) is used to test TIME values to determine whether the current iteration value is to be counted (step 164). As multiple iterations occur many values of TIME are found to be the same. During a first stage, a histogram approach is used (166, 168) to accept a value for TIME which is approximates REV minus the time to rotate one sector (SECTOR_TIME) to an accuracy of approximately 0.1 ms. In one embodiment, the first value of TIME to occur in 100 iterations is accepted (see steps 168, 170). Thereafter for future iterations, when the same value for TIME is incurred (see steps 172, 174, 176, 178), the value is examined to a higher precision (see step 180). The first higher precision TIME to occur 100 times is selected (see steps 182, 184). Such higher precision TIME (ALMOST_REV) in one embodiment is an estimate of REV SECTOR_TIME to a precision of approximately 0.01 ms.

Note that for some of the iterations during the first stage some values for TIME are off by one revolution. Others are off by an odd amount of time due to a change in track. Such values occur less often and thus are eliminated using the histogram approach. Although a histogram approach is described, other methods of filtering out values and selecting a median value for REV or ALMOST_REV are used in alternative embodiments.

To achieve the estimate REV for one revolution of the hard disk, an average value for the disk to rotate one sector time SECTOR_TIME is added to the ALMOST_REV value derived at step 184. Such average SECTOR_TIME is derived as the median or mean of TIME_STAMP(P-1)-TIME_STAMP(P) for each P where TIME(P) is included in the high precision histogram (i.e., for consecutive LBAs taken as being adjacent physical sectors). At step 186 the SECTOR_TIME is calculated for each P included in the high precision histogram. The average of all such values is determined at step 188. REV is calculated at step 190 as ALMOST_REV+avg SECTOR_TIME.

ZONES File:

The ZONEs file includes the following data for each zone:
  starting track number in the zone (ZONE_START_TRACK)
  starting LBA in the zone (ZONE_START_SECTOR)
  number of sectors per track (ZONE_TRACK_SIZE)
  number of tracks in the zone (NUM_TRACKS)

All of such data is readily derived once the LBA number for the first sector in each track is identified. The first sector in each track is identified from the time stamp data derived in step 142 (see FIG. 7). As discussed above (FIG. 8, steps 162, 176) a value TIME(P) is derived for each LBA, where P=LBA number. Most of the time such value is found to be approximately one revolution time of the hard disk. At other times an extra revolution of the disk occurs so the value is approximately 2 revolutions of the disk. When a track change occurs the value TIME varies away from the approximately 1 REV or approximately 2 REV values. It is the LBA for those odd occurrences that are distinguished to identify a change in track. To identify such LBAs where the track changes, TIME is divided by REV. The quotient should be approximately 1.0 or approximately 2.0 unless a track change occurred. If the quotient is found to be greater than 1.5, then one is subtracted until the result is less than 1.5. The reduced value is tested. If the reduced value is less than 1 minus a margin for error (e.g., 0.03), or is greater than 1 plus the margin for error, then the LBA is considered to correspond to a change in physical track number. In one embodiment such LBA number is the last sector on the track. Thus, the next sector LBA+1 corresponds to the first sector of another track. Once the first LBA in a track is identified for each track, then the number of sectors in each track is calculated as the difference between first sector LBAs. The number of sectors per track then are examined to determine when the number of sectors per track changes. Such change, by definition, signifies a new zone. The number of tracks per zone NUM_TRACKS, the number of sectors per track within the zone ZONE_SIZE and the first sector in the zone ZONE_START_SECTOR are thus identified for each zone.

In an alternative embodiment an interim value for REV is used to normalize TIME so that the first sector number can be detected before or during the estimation process for deriving REV. In such embodiment the interim REV value is a floating average of TIME values for each TIME(P) entered into the first histogram (i.e., passes test at step 164 to step 166). The result is a shorter data gathering process.

As described above time stamps for the LBAs are obtained in numerical order other than for the time stamps interjected for the reference location. In one embodiment the track numbers are assigned in numerical order as the tracks are identified. The first track number in a zone is stored in ZONE_START_TRACK. ZONE_START_TRACK is used in one embodiment to derive a cylinder increment between source and a destination LBA. In other embodiments the first track number is not derived. The cylinder increment is derived using an average number of sectors per track and the number of tracks per cylinder.

RT File:

In one embodiment the ZONES file data, TIME_STAMP data, and REV time are used to derive rotational time estimates (RT(LBA)) for each LBA relative to a reference position on the hard disk (e.g., sector 0). TIME_STAMP data, however, is re-obtained for each first LBA in a track. To do so, such time stamps are obtained for each first sector. A TIME_STAMP is obtained for the reference sector, then for the first sector in the track. The estimated disk rotation time (RT) for the first sector in the track is the TIME_STAMP for such first sector minus the TIME_STAMP for the reference sector. If the calculated disk rotation time estimate is greater than REV, however, REV is subtracted to bring the disk rotation time stored in the RT file to a value less than REV. The process is repeated for each track. In embodiments where caches can not be turned off, the cache is flushed between iterations of estimating RT for each first sector of a track.

The disk rotation time RT for the second sector of a track is derived by adding the average SECTOR_TIME to the RT value for the first sector of the track.

For all other sectors of a track an increment of rotation time is accumulated for each sector. For example, with the RT values for the first sector and second sector calculated, the TIME_STAMP for the third sector is subtracted from the TIME_STAMP for the second sector. Such value is expected to be a little less than REV, and is subtracted from REV. The absolute value of the result is divided by a modulus of REV with the remainder taken as the result to assure that the incremental value is less than REV. The incremental value then is added to the rotational time for the prior sector on the track. Listed below are the equations for calculating the rotational times of each sector of a track, starting with a first sector S=1 and continuing for the number of sectors per track for such zone (i.e., ZONE_SIZE):

$$RT(S=1)=TIME\_STAMP(S=0)-TIME\_STAMP(Ref)$$

$$RT(S=2)=RT(S=1)+\text{average SECTOR\_TIME}$$

$$RT(S = i; i = 3, ZONE\_SIZE) =$$

$$RT(i-1) + Rem \frac{REV - [TIME\_STAMP(i) - TIME\_STAMP(i-1)]}{mod(REV)}$$

The result is a look-up table of a rotational time RT for every sector on the hard disk relative to a reference location on the hard disk. The table is indexed by LBA number.

HT File

The HT file is a table of head movement times. There is an entry in the table for each number of cylinder differentials (Δcyl). For, example if a disk includes 1000 cylinders the head will move anywhere from 1 to 999 cylinders when changing cylinders. Thus, there are 999 entries in the table for a 1000 cylinder hard disk. Each entry is a time estimate of the time for the head to move a given number of cylinders. The index into the table is the number of cylinders to move—Δcyl.

In one embodiment the cylinder differential (Δcyl) for a given increment is determined by alternately obtaining a time stamp upon completion of an I/O request to a reference position and a sector on a track a known cylinder increment (Δcyl=t) away from the reference position. Time stamp pairs are obtained for each sector of the track. Using the ZONES table data, a track is selected which is a known cylinder increment away from a reference position (e.g., sector 0). Time stamp pairs then are generated for each sector of such track. The difference between the time stamp for the reference and for a given sector is the access time from the reference to the given sector. The estimated head movement time for the cylinder increment (HT(Δcyl=t) is the minimum access time for all sectors on the track. A track is examined for each potential cylinder increment to derive estimated head movement times. A head movement time estimate is stored in the HT file and accessed by cylinder increment for each cylinder increment from 0 to Y, where Y is the number of cylinders minus one.

An examination of the access times for each sector of a tested track during HT file generation reveals that the minimum access time and maximum access time are at adjacent sectors. This is because for one sector the disk rotated under the seek mechanism 16 at the same time the head 14 moved the desired cylinder increment. For a sector adjacent to one side of such one sector the disk rotated under the seek mechanism just before the head moved the desired cylinder increment. Thus, the disk had to make another revolution. For a hard disk having a the disk rotation time which is less than the head movement time for a cylinder increment of 1, the access time for adjacent sectors is close with one being longer or shorter by a rotation of one sector of the track. Only at the minimum and maximum access times is there a substantial jump. Thus, in an alternative embodiment one looks for such substantial jump and takes the lesser time magnitude as the head movement time. In one embodiment a change in access time of at least 0.8 times the estimated revolution time is tested for.

Alternative Methods of Estimating Rotational Time

According to an alternative embodiment the rotational time estimate between source and destination (i.e., corresponding to the 'first estimate' at step 90 of FIG. 4) is derived by calculating such time during the run-time process rather than by looking up rotational times estimates for the source and destination in the RT table. For a known hard disk geometry the first sector in each track is positioned at a known rotation time offset (e.g., offset k=2 ms) away from the last sector of the prior track. The rotational time estimate between source and destination is determined by calculating a first time component which is a disk rotation time estimate between the destination LBA and the first sector in the destination's track. A second time component is the disk rotation time estimate between the source LBA and the first sector in the source's track. A third time component is the offset constant (k) times the track differential between source and destination. The track differential is estimated as the integer portion of the destination LBA minus source LBA divided by the average number of sectors per track. The calculated rotational time estimate is the first component plus the third component minus the second component. Following are the equations for rotational time estimates for each sector of a track:

First comp=[LBA# (DEST)−LBA# (First in DEST's track)] * Avg SECTOR_TIME

Second comp=[LBA# (SRC)−LBA# (First in SRC's track)] * Avg SECTOR_TIME

Third comp=k * [LBA# (DEST)−LBA# (SRC)] / AVG_SECTORS_PER_TRACK

RTE (DEST)=First comp−Second comp+Third comp

In another embodiment an RT' table or file is generated instead of the RT file/table wherein the RT' table includes rotational time estimates for only the first sector in each track relative to the reference position. The rotational time estimate table RT' is generated off-line or at installation. Relative rotational time of a source LBA (Source component) is calculated by adding the product of sector offset of the source within the source's track and the average time for the disk to rotate one sector, to the value in the RT' table for the source's track. Relative rotational time of the destination (Destination component) similarly is similarly calculated. The difference in relative rotational time estimates for source and destination then is adjusted based on the incremental number of tracks between the source and destination. The adjusted value is the first estimate described above with regard to step 90 of FIG. 4.

Source comp=RT'(SRC track)+(SRC's sector offset * AVG_SECTOR_TIME)

Destination comp=RT'(DEST track)+(DEST's sector offset * AVG_SECTOR_TIME)

First estimate=Destination comp−Source comp+k(Δcyl)

where k is a constant (rotation time between first sector of a track and last sector of prior track).

Memory Storage Media for Computer Program Embodiment

The run-time process and data gathering processes executed for estimating access time and disk I/O scheduling are stored in digital electronic format on a CD_ROM, diskette, or other electronic media enabling distribution and transfer of the computer programs embodying the processes. In another embodiment the computer instructions and data forming the stored run-time process and data gathering processes are downloaded from one computer to another computer via a communications connections.

Such processes are installed on a host computer hard drive. The data gathering processes are performed to derive the RT file, ZONES file, HT file, and other miscellaneous data. Such files and miscellaneous data are stored on a host computer hard drive once derived.

In another embodiment, the RT file, ZONES file, HT file, and other miscellaneous data characterizing a given hard drive are predetermined and stored on the hard drive. In another embodiment, the RT file, ZONES file, HT file, and other miscellaneous data characterizing a given hard drive are predetermined and downloaded directly onto the hard drive without the host computer executing the data gathering processes.

For some host computers, portions of the processes and files also are stored in RAM during execution.

In an alternative embodiment, the run-time process is embedded into a hard drive controller and the RT file, ZONES file, HT file, and other miscellaneous data are also embedded into the hard drive (e.g., resident RAM or hard disk space).

Exemplary Host Computer System

Figure 9:
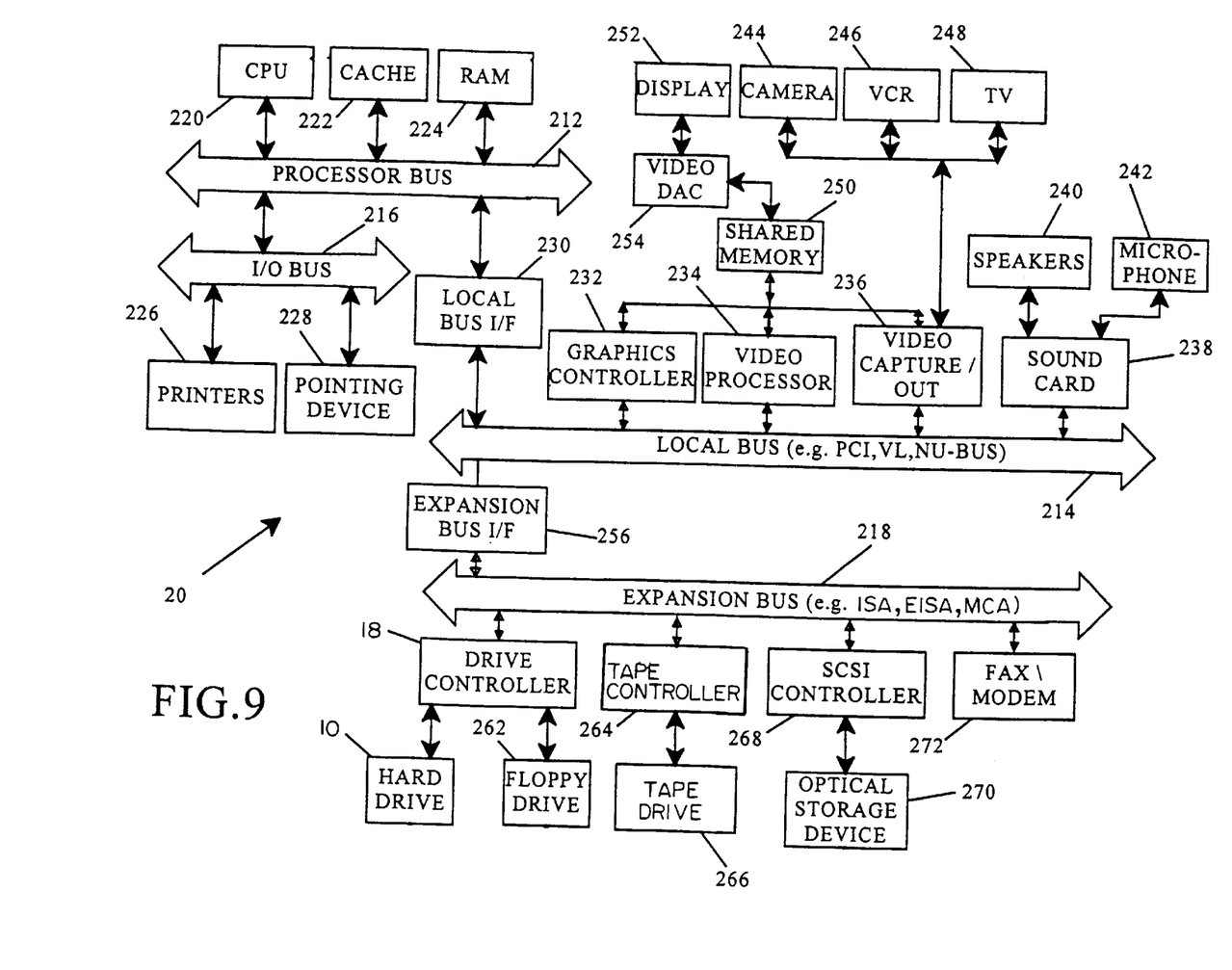
FIG. 9 is a block diagram of an exemplary host computer system.

FIG. 9 shows an exemplary microcomputer system 20 and hard drive 10 hosting the run-time process and data gathering processes. In one embodiment such processes are executed by one or more host processors. In another embodiment the run-time process is executed by the hard disk drive's microcontroller 18 and the data gathering processes are pre-executed with the RT file, ZONES file, HT file, and other miscellaneous data also embedded into the hard drive (e.g., resident RAM or hard disk space).

The microcomputer 20 includes a central processing unit 220, system memory (e.g., 222, 2024), multiple communication busses 212, 214, 216, 218 and several system components and peripherals. The microcomputer 20 may be a work station, personal computer, or any of several other standardized and proprietary general purpose or embedded microcomputers. The number and types of communication busses, system components and peripherals may vary. For the microcomputer 10 shown, there is a processor bus 212, local bus 214, I/O bus 216 and expansion bus 218. A CPU 220, external cache 222 and system RAM 224 are located on the processor bus. An I/O bus 216 is linked to the processor bus 212 for interfacing to I/O ports. A printer 226 and pointing device 228 (e.g., mouse) typically are coupled to the I/O bus 216 via I/O ports.

A local bus 214 is linked to the processor bus 212 via a local bus interface 230. Exemplary local busses are the video local (VL) or VESA-standard bus, the peripheral component interface (PCI) bus and the NU-BUS. The PCI bus, for example, may couple up to 10 peripheral devices. Illustrated are a graphics controller 232, video processor 234, video capture/output card 236 and a sound card 238. Such peripherals are used in multimedia and audio-video production systems. Speakers 240 and a microphone 242 are linked to the sound card. A camera 244 (e.g., camcorder), VCR 246 and TV 248 are linked to the video capture/output card 236. The video subsystems 232, 234, 236 typically share a local memory resource (i.e., frame buffer or video RAM) 250. Information is passed to a display 252 from the video subsystems and shared memory 250 via a video DAC 254.

An expansion bus 218 is linked to the processor bus 212 via the local bus 214 and an expansion bus interface 256. Peripherals, system components and mass storage devices typically are coupled to the expansion bus 218. Shown are a drive controller 18 coupling to a hard disk drive 10 and a floppy disk drive 262, a tape controller 264 coupling to a tape drive 266, a SCSI controller 268 coupling to an optical storage device 270 or other SCSI peripheral, and a fax/modem 272. As an alternative to the SCSI controller 268, any of several proprietary controllers also may couple to an optical storage device 270. According to other architectures the hard drive 10 and/or the optical storage device 270 (e.g., CD-ROM) and there respective controllers instead may be coupled to the local bus 214.

Although the methods disclosed are described in the context of a hard disk drive, the methods are applicable in alternative embodiments to other rotating storage disks (e.g., floppy disks, bournoulli disks optical disks, phase change disks) having a constant rotational speed. The inventive methods are applied to disks regardless of whether the disks include bad sectors which are re-mapped. Average performance improvements still result.

What is claimed is:

1. A method for estimating access time of a rotating storage disk between a source logical block address and a destination logical block address, the disk comprising a plurality of tracks, each track comprising a plurality of sectors, a given sector addressed by a host computer using a logical block address, wherein the plurality of sectors for a given track have consecutively numbered logical block addresses starting from a first logical block address for the given track, the method comprising the steps of:

looking up a first rotational time estimate for the source logical block address and a second rotational time estimate for the destination logical block address from a table of rotational time estimates accessed by logical block address number, each entry in the table of rotational time estimates having a value not more than one rotational time of the disk;

estimating radial distance between a first track having the source logical block address and a second track having the destination logical block address based upon the source logical block address and the destination logical block address;

looking up a head movement time estimate corresponding to the calculated radial distance in a head movement time estimate table; and     deriving the estimated access time from the first rotational time estimate, second rotational time estimate and head movement time estimate.

2. The method of claim 1, in which the rotational time estimate table and head movement time estimate table are derived off-line relative to a run-time process comprising the rotational time estimate looking up, radial distance determining, head movement time estimate looking up and estimated access time deriving steps.

3. A method for estimating access time of a rotating storage disk between a source logical block address and a destination logical block address, the disk comprising a plurality of tracks, each track comprising a plurality of sectors, a given sector addressed by a host computer using a logical block address, wherein the plurality of sectors for a given track have consecutively numbered logical block addresses starting from a first logical block address for the given track, the method comprising the steps of:

looking up a first rotational time estimate for the source logical block address and a second rotational time estimate for the destination logical block address from a table of rotational time estimates accessed by logical block address number, each entry in the table of rotational time estimates having a value not more than one rotational time of the disk;

estimating radial distance between a first track having the source logical block address and a second track having the destination logical block address based upon the source logical block address and the destination logical block address;

looking up a head movement time estimate corresponding to the calculated radial distance in a head movement time estimate table;

deriving the estimated access time from the first rotational time estimate, second rotational time estimate and head movement time estimate; and wherein the rotational time estimate table is generated in a disk data gathering method, comprising the steps:

for each one logical block address on a disk obtaining a completion-time time stamp for processing an I/O request for said one logical block address;

estimating time for the disk to make one revolution from a plurality of completion-time time stamps;

for the first logical block address of each track, obtaining a completion-time time stamp for said first logical block address and for a reference logical block address and storing rotational time estimate for said first logical block address as a difference between the completion-time time stamp for said first logical block address and said reference logical block address; and for each i-th logical block address of a plurality of logical block addresses of a given track, storing rotational time estimate as the rotational time estimate for the i-1th logical block address plus an incremental time estimate for the i-th logical block address.

4. The method of claim 3, in which the incremental time estimate corresponds to the revolution time estimate less a difference between completion-time time stamp for the i-1th logical block address and the completion-time time stamp for the ith logical block address.

5. The method of claim 3, further comprising the step of identifying a first of the plurality of logical block addresses for each track of the disk by differencing a time stamp for a given logical block address on a given track with a numerically adjacent logical block address to said given logical block address, said given logical block address being the first of the plurality of logical block address along the given track when the difference is not within a prescribed margin of estimated revolution time.

6. Memory storage media encoded with executable instructions and data representing a computer program that cause a computer to perform a set of functions, comprising:

means for determining a first rotational time estimate for a source logical block address and a second rotational time estimate for a destination logical block address from a table of rotational time estimates accessed by logical block address number, each entry in the table of rotational time estimates having a value not more than one rotational time of a rotational storage disk;

means for estimating radial distance between a first track having the source logical block address and a second track having the destination logical block address based upon the source logical block address and the destination logical block address;

means for looking up a head movement time estimate corresponding to the calculated radial distance in a head movement time estimate table; and means for deriving the estimated access time from the first rotational time estimate, second rotational time estimate and head movement time estimate.

7. A computer system, comprising:

a disk drive having a disk comprising a plurality of disk platens for storing information, each platen comprising a plurality of tracks, each track comprising a plurality of sectors, each sector corresponding to a unique logical block address for accessing the information stored at the sector, the disk characterized by a plurality of cylinders, each cylinder comprising a constant number of the tracks;

means for requesting access to the disk drive using logical block addresses; and means for estimating access time of the disk between a source logical block address and a destination logical block address, the access time estimating means comprising:

means for looking up a first rotational time estimate for the source logical block address and a second rotational time estimate for the destination logical block address from a table of rotational time estimates accessed by logical block address number, each entry in the table of rotational time estimates having a value not more than one rotational time of the disk;

means for determining radial distance between a first track having the source logical block address and a second track having the destination logical block address based upon the source logical block address and the destination logical block address;

means for looking up a head movement time estimate corresponding to the calculated radial distance in a head movement time estimate table; and means for deriving the estimated access time from the first rotational time estimate, second rotational time estimate and head movement time estimate.

8. A computer system, comprising:

a disk drive having a disk comprising a plurality of disk platens for storing information, each platen comprising a plurality of tracks, each track comprising a plurality of sectors, each sector corresponding to a unique logical block address for accessing the information stored at the sector, the disk characterized by a plurality of cylinders, each cylinder comprising a constant number of the tracks;

means for requesting access to the disk drive using logical block addresses; and means for estimating access time of the disk between a source logical block address and a destination logical block address, the access time estimating means comprising:

means for looking up a first rotational time estimate for the source logical block address and a second rotational time estimate for the destination logical block address from a table of rotational time estimates accessed by logical block address number, each entry in the table of rotational time estimates having a value not more than one rotational time of the disk;

means for determining radial distance between a first track having the source logical block address and a second track having the destination logical block address based upon the source logical block address and the destination logical block address;

means for looking up a head movement time estimate corresponding to the calculated radial distance in a head movement time estimate table; and means for deriving the estimated access time from the first rotational time estimate, second rotational time estimate and head movement time estimate;

means for generating the rotational time estimate table; the generating means comprising:
(i) means for obtaining a completion-time time stamp for each logical block address on the disk;
(ii) means for estimating time for the disk to make one revolution from a plurality of completion-time time stamps;
(iii) for the first logical block address of each track, means for obtaining a completion-time time stamp for said first logical block address and for a reference logical block address and means for storing rotational time estimate for said first logical block address as a difference between the completion-time time stamp for said first logical block address and said reference logical block address; and
(iv) for each i-th logical block address of a plurality of logical block address of a given track, means for storing rotational time estimate as the rotational time estimate for the i-1th logical block address plus an incremental time estimate for the i-th logical block address.

9. The computer system of claim 8, in which the incremental time estimate corresponds to the revolution time estimate less the difference between completion-time time stamp for the i-1th logical block address and the completion-time time stamp for the ith logical block address.

10. The computer system of claim 8, further comprising means for identifying a first logical block address along a track of the disk for each track to be a one logical block address corresponding to a completion-time time stamp difference with a numerically adjacent logical block address to said one logical block address in which the completion-time time stamp difference is not within a prescribed margin of estimated revolution time.

11. A method for scheduling an I/O request to a rotating storage disk which is to follow a first I/O request to the rotating storage disk, the rotating storage disk comprising a plurality of tracks, each track comprising a plurality of sectors, a given sector addressed by a host computer using a logical block address, wherein the plurality of sectors for a given track have consecutively numbered logical block addresses starting from a first logical block address for the given track, wherein the first I/O request specifies a source logical block address, the method comprising the steps of:

looking up a first rotational time estimate for the source logical block address from a table of rotational time estimates accessed by logical block address number, each entry in the table of rotational time estimates having a value not more than one rotational time of the disk;

for a second I/O request, looking up a second rotational time estimate for the destination logical block address from the table of rotational time estimates;

estimating radial distance between a first track having the source logical block address and a second track having the destination logical block address based upon the source logical block address and the destination logical block address;

looking up a head movement time estimate corresponding to the calculated radial distance in a head movement time estimate table;

deriving the estimated access time for the first I/O request from the first rotational time estimate, second rotational time estimate and head movement time estimate;

repeating the steps of looking up the second rotational time estimate, estimating the radial distance, looking up the head movement time estimate and deriving the estimated access time for at least one other I/O request, wherein for each repetition the destination logical block address is determined by the I/O request corresponding to the repeated steps; and scheduling one I/O request of the second I/O request and said at least one other I/O request to follow the first I/O request.

12. The method of claim 11 in which the rotational time estimate table is generated in a disk data gathering method, comprising the steps:

for each one logical block address on a disk obtaining a completion-time time stamp for processing an I/O request for said one logical block address;

estimating time for the disk to make one revolution from a plurality of completion-time time stamps;

for the first logical block address of each track, obtaining a completion-time time stamp for said first logical block address and for a reference logical block address and storing rotational time estimate for said first logical block address as a difference between the completion-time time stamp for said first logical block address and said reference logical block address; and for each i-th logical block address of a plurality of logical block addresses of a given track, storing rotational time estimate as the rotational time estimate for the i-1th logical block address plus an incremental time estimate for the i-th logical block address.

13. A computer system, comprising:

a disk drive having a disk comprising a plurality of disk platens for storing information, each platen comprising a plurality of tracks, each track comprising a plurality of sectors, each sector corresponding to a unique logical block address for accessing the information stored at the sector, the disk characterized by a plurality of cylinders, each cylinder comprising a constant number of the tracks;

means for requesting access to the disk drive using logical block addresses; and means for estimating access time of the disk between a source logical block address and a destination logical block address, the access time estimating means comprising:

means for looking up a first rotational time estimate for the source logical block address and a second rotational time estimate for the destination logical block address from a table of rotational time estimates accessed by logical block address number, each entry in the table of rotational time estimates having a value not more than one rotational time of the disk;

means for determining radial distance between a first track having the source logical block address and a second track having the destination logical block address based upon the source logical block address and the destination logical block address;

means for looking up a head movement time estimate corresponding to the calculated radial distance in a head movement time estimate table;

means for deriving the estimated access time from the first rotational time estimate, second rotational time estimate and head movement time estimate; and means for selecting one of a plurality of I/O requests to follow a first I/O request by comparing derived estimated access time for each one of said plurality of I/O requests.

14. The computer system of claim 13, further comprising means for generating the rotational time estimate table; the generating means comprising:

means for obtaining a completion-time time stamp for each logical block address on the disk;

means for estimating time for the disk to make one revolution from a plurality of completion-time time stamps;

for the first logical block address of each track, means for obtaining a completion-time time stamp for said first logical block address and for a reference logical block address and means for storing rotational time estimate for said first logical block address as a difference between the completion-time time stamp for said first logical block address and said reference logical block address;

for each i-th logical block address of a plurality of logical block address of a given track, means for storing rotational time estimate as the rotational time estimate for the i-1th logical block address plus an incremental time estimate for the i-th logical block address.

* * * * *